United States Patent [19]

Crane et al.

[11] Patent Number: 4,718,102
[45] Date of Patent: Jan. 5, 1988

[54] PROCESS AND APPARATUS INVOLVING PATTERN RECOGNITION

[75] Inventors: Hewitt D. Crane, Portola Valley; John S. Ostrem, Palo Alto, both of Calif.

[73] Assignee: Communication Intelligence Corporation, Menlo Park, Calif.

[21] Appl. No.: 35,278

[22] Filed: Apr. 3, 1987

Related U.S. Application Data

[63] Continuation of Ser. No. 531,305, Sep. 9, 1983, abandoned, which is a continuation-in-part of Ser. No. 459,282, Jan. 19, 1983, Pat. No. 4,561,105.

[51] Int. Cl.$^4$ .............................................. G06K 9/00
[52] U.S. Cl. ...................................... 382/13; 382/24; 382/30; 382/38
[58] Field of Search .................. 382/3, 13, 14, 15, 16, 382/24, 30, 37, 38, 40, 57

[56] References Cited

U.S. PATENT DOCUMENTS

| | | | |
|---|---|---|---|
| 4,030,068 | 6/1977 | Banz | 382/38 |
| 4,284,975 | 8/1981 | Odaka . | |
| 4,365,235 | 12/1982 | Greanlas et al. | 382/13 |
| 4,564,752 | 1/1986 | Lepic et al. | 382/57 |

OTHER PUBLICATIONS

25, No. 3, *IBM J. Res. Develop.*, 187, May, 1981.
*Pattern Recognition*, vol. 13, No. 3, p. 191, Pergamon Press, 1981.
K. Nakata, et al. "Chinese Character Recognition" Special Paper pp. 10–14, 1973.
Shin-Ichi Hanaki, et al. "On-Line Recognition of Handprinted Kanji Characters", vol. 12, pp. 421–429, Pergamon Press Ltd.

*Primary Examiner*—Leo H. Boudreau
*Assistant Examiner*—Jose L. Couso
*Attorney, Agent, or Firm*—Townsend and Townsend

[57] ABSTRACT

Processing of handwritten patterns, for example, inputting of complex characters, such as Kanji, into a word processor involves a balance between an algorithmic part and a disambiguation part. Application of routines uniformly during the algorithmic part deliberately results in confusion sets of characters which are subsequently differentiated during the disambiguation part. Balance between the two parts permits a flexibility to accommodate differences in writing styles, while application of routines customized to the established character patterns permits the unique solution necessary for accurate recognition of a character.

62 Claims, 11 Drawing Figures

| STROKE | STROKE CODE |
|--------|-------------|
| ╲ | A |
| — | B |
| │ | C |
| ╱ | D |
| ╲ | E |
| ╱ | F |
| ↓ | G |
| ⌐ | H |
| Z | I |
| ∠ | J |
| ς | K |
| ረ | L |
| 3 | M |
| 3 | N |
| ⁊ | O |
| ﹄ | P |
| L | Q |
| ⌐ | R |
| ⌐ | S |
| ⌐ | T |
| ↘ | U |
| ∠ | V |
| ⌣ | W |
| ↓ | X |
| ⌐ | Y |

PROCESS AND APPARATUS INVOLVING PATTERN RECOGNITION

This is a continuation of application Ser. No. 531,305, filed Sept. 9, 1983, now abandoned, which is a continuation-in-part of U.S. Ser. No. 459,282, filed Jan. 19, 1983, now U.S. Pat. No. 4,561,105.

BACKGROUND OF THE INVENTION

The invention is concerned with pattern processing. The most significant field involves patterns used in human communication. Aspects are as simple as typewriting or typesetting which at this time may entail only simple mechanical apparatus for replicating a selected inscribed character in another medium. Others are more sophisticated and the human interface may be only an initial step. Examples include word processing in which application of extensive artificial intelligence follows inputting.

For the most part, processing of alphabetic letters (or patterns) used in Western languages is accomplished by use of the familiar keyboard approach. The keyboard continues to serve well. The degree of skill required even for professional stenography is within the practical grasp of most, and this requirement, too, is substantially lessened where speed is not of the essence. Professionals and non-professionals in a variety of disciplines, all without formal stenographic training, are reasonably comfortable with keyboard inputting for art searches, word processing and the like.

These objectives are not so easily accomplished where processing entails larger numbers of patterns. Ideographic languages such as Kanji, are a prime example.

It is well known that a Chinese scholar may make use of 10,000 or more characters in written communication. The bulk of these Chinese characters find use in Japanese adaptation, Kanji, as well, although the problem is somewhat alleviated by two phonetic languages, Hiragana and Katakana. "Simplified vocabularies", such as Japanese Industrial Standard 1, (JIS-1) are in widespread use. JIS-1 contains only about 3,000 characters. Many users, however, continue to employ more extensive vocabularies. Processing may even be further complicated by the inclusion of the phonetic languages which introduce some seventy additional characters per language—more than twice those in the typical Western alphabetic language.

DESCRIPTION OF THE PRIOR ART

Initial approaches to processing of ideograms and subsidiary characters as used in Japanese have involved keyboards sometimes in the form of a thousand or more characters; sometimes with a reserve of replaceable characters. A more recent approach makes use of a touch board. This is an array of 2000 or more characters arranged phonetically. Touching the appropriate character generates an x-y signal that identifies a corresponding character in memory—e.g., in a hard-wired or magnetic computer memory. While the approach has gained some acceptance, there are practical size limitations. Users complain of boredom, and frequent rest periods are desirable.

Promise of a more natural solution, one based on handwriting recognition, has tantalized industry for some years. Input would be accomplished by writing characters exactly as they are conventionally written. Registration equipment, such as an appropriately equipped pen and/or tablet would convert characters into electrical impulses conveying x-y coordinate information. These impulses then constitute the input which would be processed and ultimately subjected to recognition programs involving matching with information in memory.

Effort to develop a system based on handwriting recognition has been extensive. All of the obvious algorithmic approaches have been tried. Systems have depended upon overall pattern matching, as well as on stroke labeling. Stroke labeling systems, generally realtime, have sometimes supplemented shape with sequence information; sometimes with position information. Sophisticated approaches have taken account of individual as well as stylistic variations. So, for example, algorithms designed to accommodate different writing habits have provided for permitted deviations in slope. "Filtering" approaches have been used to remove ripples, as well as unwanted hooks or other distortions at the beginning or end of strokes.

Systems designed to accept the necessary range of variations have been of limited value. The best systems introduced to date have been reasonably accurate but have depended upon highly trained operators writing with near draftsman-like precision.

Systems designed to accommodate more usual writing have foundered. "Loosening" algorithms to accommodate variations in writing habit have increased ambiguity. "Tightening" algorithms to improve precision and, therefore, to improve differentiation have increased the incidence of non-recognition. It is puzzling that the ordinary human reader has little problem either with confusion or non-recognition. Clearly, the ordinary reader does not, like the usual algorithm, compare every stroke or every character with every other stroke or character in memory.

A system representative of an approach described by NTT, U.S. Pat. No. 4,284,975, filed in the United States of America on Nov. 30, 1979, has been introduced commercially. In accordance with the patent description, it uses picture matching with strokes defined by a limited number of "feature points"—three in number for characters of four or more strokes. Recognition is based on the least total (or average) deviation of all registered feature points with those in memory. Variations described in the patent or in adaptations provide for omission of beginning and end of strokes to accommodate unmeaningful hooks; for increased number of points as stroke complexity increases or as stroke number decreases and for added characters in memory in which strokes vary in slope to accommodate different writing habits. Accuracy of a commercial version is judged to be excellent providing entries are of block-like, near-printed precision.

Another system is described by NEC workers in *Pattern Recognition*, Vol. 12, pages 421–429; Pergamon Press Ltd., 1980. It depends on stroke shape as well as spatial relations between strokes. Stroke sequence is taken into account as well. "Dynamic Programming" entails identifying strokes in terms of two points—beginning and ending at a position in terms of a "zone" defined by preceding strokes. A commercial model offered by NEC is presumably based on this system.

In 6 (2), "Asia Electronics Union, 10 (1973), Hitachi workers described an on-line recognition system claimed to be capable of yielding higher than 90 percent accuracy for more than 950 characters. Needed improvements identified in the paper include "Development of an algorithm ... which will minimize errors due to individual handwriting styles". The system has a number of levels which depend for recognition on: (a) number of strokes and complex stroke set, (b) simple stroke set, (c) stroke sequence. Beyond this, any unrecognized character is subjected to a complex algorithm which depends on appearance of specific strokes in specific positions and on a variety of other inter- and intra-stroke characters.

An IBM entry is described in 25, No. 3, *IBM J. Res. Develop.*, 187, May, 1981. Again, use is made of an electronic tablet. Recognizing that prior (unsuccessful) systems have depended upon simple stroke counts, specific stroke shapes, relative stroke position, etc., the system described in the paper instead employs a set of 72 constituent "shapes" ("alphabetic elements"). The described system uses an electronic tablet with 200 points/inch definition and with 80 points/second sampling speed. Fluctuations are removed by signal filtering, and filtered stroke signals are analyzed. Analysis is in terms not of entire strokes but of "line segments"—that is, stroke portions that do not contain a significant change in direction. A 2.5 megabyte memory serves for recognition of 2,000 characters. The system has not been marketed.

A particularly significant paper, entitled "On-Line Recognition of Handwritten Characters Utilizing Positional and Stroke Vector Sequences" appeared in *Pattern Recognition*, Vol. 13, No. 3, page 191, Pergamon Press, 1981. The described approach to stroke vector sequence is somewhat different from other stroke recognition systems in that stroke shape characterization is based on only 5-10 percent of stroke length. In other respects, it appears to combine criteria of other systems, i.e., positional relations between successive strokes. The paper is cited here for matter appearing on page 200 in which groups of pairs or triplets of confused characters are discriminated. Discrimination takes the form of specific study of confused pairs or triplets with reliance being had on some specific characteristics—for example, an intercept between two particular numbered strokes which appears in only one character of the confused group. Experimental results reported are for "recognition scores of 90 to 93 percent (true character only) or 94 to 98 percent (indication of correct ... including the true character)".

It appears that virtually all characterizing information has been used in an attempt at character recognition. Proposed systems have used pattern matching directly and others have depended on initial stroke labeling. Systems based on stroke labeling have used stroke shape, stroke position, portions of stroke length, and stroke sequence. They have preprocessed information, have minimized quivering by filtering out ripples and have ignored initial and end portions of strokes containing meaningless hooks. Sophisticated systems have taken account of most or all observable interstroke characteristics. More advanced forms of all approaches have taken account of accepted variants, such as stroke sequence variations, as well as variations in writing style.

It appears that every approach has undergone development to result in either of two basic problems: a high degree of precision which, as used by less trained operators, results in non-recognition; or a degree of laxity to accommodate variation, resulting in confusion. As to the latter, the technical literature uniformly suggests use of algorithms of ever increasing complexity to minimize confusion. Only after every attempt has been made to identify characters algorithmically is resort had to discrimination as among members of confusion groups.

SUMMARY OF THE INVENTION

The present invention represents a departure from these approaches. Character recognition procedures in accordance with the invention are in two parts:

(1) An algorithmic part in which rules are uniformly applied to all or large groupings of characters with the rules designed to yield groups of confused characters ("confusion set"), and (2) A non-algorithmic part in which information specific to particular characters is applied to "disambiguate" (to eliminate all but a specific character included in each set).

Disambiguation routines are designed only to differentiate members of confusion sets of characters. Each routine is designed for application to a specific character in the dictionary and looks for specific identifying characteristic(s) to qualify a character.

The essence of the inventive approach is balance between the two parts. Handwriting recognition or more generally, pattern recognition, required in all systems and apparatus in accordance with this invention necessarily depend both on the algorithmic procedures familiar to the ordinary programmer and to the "disambiguation" procedures (which are non-algorithmic, i.e., are not uniformly applied to all patterns but only for the character for which designed). Disambiguation depends to a large extent on human judgment derived from actual experience in differentiating members of confusion sets.

In general it has been found useful to follow initial algorithmic routines with non-algorithmic. This seems "natural" since it is this order in which the program is usually constructed. However, the order is unimportant, and the program may be operated in reverse or with algorithmic and non-algorithmic steps interspersed. The "forward direction" is generally somewhat more economical of computer time and is therefore preferred. "Forward" means algorithmic part (all algorithmic steps including dictionary matching) to actually yield confusion sets (in accordance with the manner in which the algorithmic part is designed) followed by the non-algorithmic part (disambiguation).

Further discussion of the invention is primarily in terms of characters used in human communication as well as "forward" processing. This is for tutorial expediency and is not intended to limit the inventive teaching.

Systems and apparatus of the invention depend on design of algorithmic steps which if used without disambiguation (without non-algorithmic steps) result in deliberate development of confused sets of characters (avoids unique recognition by algorithmic phase processing alone). An absolute minimum requirement is an average of two characters per confusion set as yielded by algorithmic part processing alone with such sets yielded for at least half the entries. This minimum applies to relatively simple tasks as, for example, non-cursive English. For a more complex task, such as the limited Kanji JOYO vocabulary (containing approximately 2,000 characters) as used by the average high school graduate in Japan, a more usual confusion set as yielded by algorithmic processing alone includes at least three or four or five or even ten characters, and fewer than one out of five or ten and preferably thirty entries results in unique recognition. The desired average for JOYO upon application of algorithmic routines alone is at least five members per confusion set. The required average and permitted unique recognitions scale at least linearly with vocabulary size. The corresponding desired average for JIS-1 industry standard of approximately 3,000 characters is at least 3000/2000×5 or at least 7.5 members per average confusion set as well as a linearly reduced number of unique recognitions before disambiguation (<1/10×2000/3000=1/15) to result in accurate recognition in accordance with the invention (less preferred criteria also scale linearly).

The unusual departure is dramatically characterized by the observation that unwanted unique recognition upon dictionary matching (after only algorithmic routines) is an indication of unwanted precision on the basis of which the algorithmic routines are relaxed during construction of the program until the desired confusion is produced.

In a meaningful sense, the disambiguation procedures simulate human experience. Use of non-uniform, customized routines based on actual study of particular characters, directly or indirectly by human subjects, represents a simulation of human rather than artificial intelligence. This "human intelligence" set of routines is designed to distinguish members of confusion sets. Actual experience with an embodiment of the invention demonstrates that the required looseness in the algorithmic part is sufficient to accommodate usually encountered variations in writing habits.

Other aspects of various embodiments are described in the Detailed Description. The "algorithmic part", while contemplating uniform application of rules to all or to large groupings of characters (many times larger than confusion sets) also benefits from human experiences. For example, it is observed that certain strokes or portions of strokes are usually drawn with greater precision and that positional criteria may be non-uniform as well. Stroke criteria or positional criteria used in algorithmic processing in accordance with versions of the invention may reflect this.

Even though the inventive approach will, at least initially, be of greatest value as used with complex non-alphabet languages, it may be expected to find other uses. These include processing of cursive alphabetic writing as well as lettering and numbering in general. Useful processes and/or apparatus in accordance with the invention are expected to be applied to varieties of patterns that do not find use in human language.

BRIEF DESCRIPTION OF THE DRAWINGS

FIGS. 8, 9 and 10 are characters in an exemplary confusion set.

DETAILED DESCRIPTION

1. General

The general outline of the inventive approach has been described in the Summary of the Invention. In a preferred embodiment, use is made of algorithms based on stroke shape and sequence. Disambiguation (the non-algorithmic step) depends upon other characteristics—notably interstroke characteristics and on some additional intrastroke characteristics which were deliberately omitted as unwanted or not generally necessary in the algorithmic routines. From the standpoint of processing time this preferred embodiment is in the forward direction, i.e., identification of stroke strings followed by dictionary matching and finally by disambiguation where required (where dictionary matching yields confusion sets). It must be emphasized that order has been varied, e.g., to reverse or intersperse algorithmic and non-algorithmic steps, with identical results.

It is important to appreciate the nature of the disambiguation procedure—that is, the procedure which in forward processing follows dictionary matching in which, in general, a "confusion set" of characters (rather than a unique character) is identified. The disambiguation procedure is non-algorithmic, that is, routines are uniquely applied to particular characters. In forward processing disambiguation routines are applied only to characters in confusion sets. If disambiguation is applied before dictionary matching the routines are necessarily applied to larger numbers of characters, e.g., all dictionary characters to be compared with a particular entry. In forward processing uniform criteria are applied to large groups or to all characters up to and including dictionary matching. In disambiguation, which in forward processing follows dictionary matching, use is made of criteria specific to members of confusion sets as identified and made part of memory. Use of such specific criteria constitute a "human intelligence" phase of the invention. This phase is also described as "non-algorithmic".

A preferred embodiment was briefly described in the summary. It depends on stroke shape and sequence in the algorithmic phase and uses interstroke characteristics only during the non-algorithmic phase. Alternatives are apparent. For example, disambiguation criteria and algorithmic criteria may be interposed. Accordingly, algorithmic criteria may be based on spatial relationship of strokes (relative coordinate positions) as well as on presence or absence of intercepts, and disambiguation may take the form of intrastroke characteristics such as stroke shape. However, where stroke shape is utilized in disambiguation as in any disambiguation routine in accordance with the invention, criteria are applied to a particular character. In this alternative embodiment, spatial criteria are uniformly applied to all or large sets of characters, and disambiguation uses shape characteristics of stroke(s) of a particular character. (Of course, by analogy to the preferred embodiment, disambiguation may also utilize interstroke characteristics omitted from the algorithmic phase.) So, whereas in the preferred embodiment disambiguation may be based on criteria such as presence or absence of an intercept as between two particular strokes, e.g., strokes 3 and 8, in this alternative embodiment, disambiguation may rely on—e.g., upward concavity of a stroke—e.g., stroke type 8.

Sound may also be used in algorithmic or non-algorithmic processing. A Chinese rather than Japanese pronunciation of Kanji characters is common, for example, for construction of phonetic dictionaries in book form, and this practice is preferred in this inventive embodiment as well.

Disambiguation is characterized by judgmental decision. It may be that the judgmental decision regards characteristics which are, themselves, difficult to reduce to algorithmic relationships or it may be that they are easily expressed in mathematical terms. In the latter event, judgment may depend upon the determination to apply or not apply a particular mathematics criterion, always in view of the specific problem on hand—designation of one ore more characteristics which serve to differentiate an entry from the associated members of a confusion set yielded during the algorithmic phase.

The required balance between algorithmic and non-algorithmic parts is discussed in the Summary of the Invention. Discussion is in terms of the minimum desired number of characters in confusion sets produced as a consequence of dictionary matching on the assumption (real or academic) that routines prior to dictionary matching are solely algorithmic. Limits discussed in terms of Kanji are generally applicable to any pattern processing with corresponding "vocabularies" (the term is used to describe the total listing of patterns which an inventive embodiment can process). "Dictionary entries" may be more numerous, since they may include variations, e.g., stroke sequence variations. Confusion sets are made up of dictionary entries.

Useful approximations of confusion set size are obtained during actual processing when a statistically meaningful number of patterns is input. If ten native writers were to write one sample of each character in the character set, an analysis of the results would yield a good estimate of the average size of the confusion sets in that particular dictionary. Even the input of one native writer of a portion of a character set would allow an analysis of the confusion set size in the dictionary.

As an example, in Kanji, inputting 100 characters for the JOYO vocabulary, or 150 characters for the JIS-1 vocabulary, would yield confusion sets of at least 5 and 7.5 members on average in a dictionary constructed according to the invention.

The required number of (a) maximum permitted unique solutions and (b) minimum average number of members per confusion set are set forth in terms of (c) vocabulary size in the Summary of the Invention. Preferred embodiments are tabulated:

| a | b | c |
|---|---|---|
| 1 in 2 or 50% | 2 | any size |
| 1 in 10 or 10% | 5 | 2,000 |
| 1 in 15 or 7.5% | 7.5 | 3,000 | with further increase in vocabulary resulting in linearly increased confusion set size. Preferred limits correspond with greater emphasis on the non-algorithmic phase (on disambiguation). A more preferred confusion set size is 50 percent greater than that indicated above with a still more preferred limit corresponding with 100 percent increase.

While indicated limits are descriptive, a rigorous analysis is in terms of the vocabulary set actually considered in processing of a particular input pattern. In the preferred embodiment, Kanji vocabulary sets are in terms of stroke count so that, e.g., only ten stroke dictionary entries are considered upon inputting of a ten stroke pattern. In Kanji, stroke count distribution is considered approximately Gaussian, peaking at about eleven strokes and tailing at one stroke and in the high twenties. The permitted unique solutions generally occur at or near the tails while confusion sets are generally largest at or near the peak. In JOYO, an average minimum number of five confusion set members corresponds with at least seven for the eleven-stroke vocabulary set.

The results of experience with an actual system are instructive. A recognition success rate in excess of 98% was achieved in a 2300 character enhanced JOYO system wherein there was a range of allowable variations in stroke, shape, sequence, number and connectedness generally common to the ordinary native writer. Fewer than about 75 (or 3%) of the characters were uniquely identified during algorithmic processing. The average confusion set size was about ten members.

Thus far, description has been largely in terms of those aspects which represent the most significant departure from the prior art. In these terms, inventive systems are two phase with one phase corresponding with the "algorithmic" routines and the second phase corresponding with the "non-algorithmic" routines. It has also been found useful to depend upon the natural difference in confusion degree as related to stroke number. Where, for example, a small number of characters use a particular number of strokes, e.g., fifteen to twenty-five, so that less confusion is to be expected for characters in this category, algorithmic decision criteria may be loosened. For less complex characters, where the number of characters in vocabulary begin to increase, less deviation may be permitted. Experience with preferred embodiments has shown the wisdom of actually disregarding completely all strokes beyond a certain stroke count.

Such variations in permitted deviation during the algorithmic phase exemplify an underlying premise: At all stages, there is an emphasis on frugality. As the human reader does not depend upon all available information where such is not required for actual discrimination, preferred systems of the invention are similarly designed. So, as noted, characterization of strokes in excess of some limit, may not be needed where, in the extreme, there may be only one or very few characters with a stroke count above the limit in the entire vocabulary. On the other hand, where stroke count is common to a large number of characters in vocabulary, some greater degree of precision is useful.

2. Processing Considerations

Other observations have led to non-uniformity. Certain strokes, possibly those in particular positions, are what may be referred to as "fiducial". Greater precision is required for such strokes. Others may be of such minor importance as to permit substantial deviation—in the extreme, such as to permit infinite deviation (any stroke of whatever shape may be accepted).

Still in terms of the preferred embodiment, stroke labeling may be accomplished by use of routines in which permitted deviation differs from point to point.

Illustrative routines suitably serving a preferred embodiment of "forward processing" are briefly described:

Step 1, writing, is orthodox. Information derived from tablets and writing implements, many of which are commercially available, may be in coordinate and/or angular form. Information gathering may depend on input from the tablet (e.g., involving positions defined by a conductive grid) or, alternatively, position/angular information may be derived from the writing implement, itself.

Step 2, preprocessing, may include a number of operations. In preferred embodiments, less meaningful writing deviations are eliminated, for example, by filtering and data smoothing. It has been found useful in the preferred embodiment to convert time-sampled data points into spatially sampled points. Analog-to-digital conversion, if needed, may be carried out at this stage or earlier if needed.

At the stroke recognition stage, each stroke is labeled with a stroke category label, or, alternatively, if an input stroke is not identified, with a question mark. Emphasis plays a significant role at the stroke recognition stage. Certain input strokes are identified with increased specificity.

Acceptance tolerances vary from stroke to stroke and from point to point within a stroke. In the preferred embodiment, tolerances are stored as part of the stroke label in memory. It has been found useful to have two types of stroke labels—those corresponding with specific strokes and those representative of groups of strokes called stroke confusion groups. Stroke confusion groups may include separately identifiable strokes which are easily confused—or, alternatively, may be designed to accommodate stroke variants corresponding with variations in writing style.

A departure from rote stroke identification is illustrative of the "human simulation" of the invention. In a preferred embodiment, stroke recognition includes a first operation in which strokes are identified as "simple" or "complex". Accpetance as "simple" at this stage (level 0) permits identification as, for example, Horizontal, Vertical, or Diagonal. Experience with Kanji indicates that at least eighty percent of all strokes may be properly labeled as "simple" at this "zero" level.

If not recognized as a "simple" stroke at the zero level, use is made of templates which correspond with stroke categories (simple, as well as complex). This processing step results in a label for each stroke (a four-stroke character is labeled with four symbols—e.g., letters for recognized strokes, and a question mark for any unrecognized stroke).

Templates in the embodiment under discussion include point-by-point tolerance acceptance. For example, if in angular terms, tolerances may be expressed as permitted angular ranges.

In illustrative terms, if initial template matching is designated "level 1", it may be followed by a number of additional levels (level 2, level 3 . . . ) generally designed to account for further variations in writing style. As described in a preferred embodiment, accommodation of different writing styles may take the form of sequential operations in which strokes, defined in angular values, are translated or rotated by a specified amount in angular or "theta space". This is an overall shift as contrasted to the point-by-point deviations of "level 1". Overall shift is in terms of translation or rotation of strokes plotted in terms of absolute angle in degree for each stroke point on one coordinate and point number (1, 2, 3 . . . ) on the other coordinate. A complete process may provide for more than one translation and/or rotation of sequentially increasing magnitude.

Dictionary matching in the embodiment under discussion is the procedure whereby the stroke labels produced in the recognition stage are compared with similar entires in memory. Here, again, there is an opportunity to simulate the human reader. Depending upon the number of strokes ina "word"; depending upon existence of particularly significant ("fiducial") strokes, further information may be rejected in the interest of avoiding further confusion. Advantage may be taken of characters which can be accurately identified without need for the specificity of a particular stroke label at every stroke position. In extreme instances—for many-stroke characters, any stroke category label (even including a question mark) may be accepted.

It has also been found acceptable in some instances to disregard presence of strokes altogether. For example, recognition of Kanji has been accomplished while labeling only the first twelve strokes during the algorithmic phase.

Dependence on stroke sequence in the preferred embodiment gives rise to additional entries to accommodate variations in sequence. Other variants—e.g., possible omission of a relatively insignificant stroke, interconnection of successive strokes, as well as other circumstances permitting substitution of different labels, also result in added dictionary entries.

3. Glossary

A glossary of terms may aid in the understanding of the invention.

Pattern: Two-dimensional design made up of one or more strokes which is intended to convey meaning. Patterns include, but are not restricted to, alphabetic or non-alphabetic representations of characters used in human communication.

Character: A pattern, such as an alphabetic letter, a number, or an ideogram which has some accepted meaning, such as a JIS designation and is therefore useful in human communication.

Stroke: Continuous "lines" of any shape of which patterns are constituted. Strokes correspond with the continuous trace produced during the time that a moving writing utensil travels from point of contact with a pad or other writing medium to the point of departure. Where of inconsequential length, a "stroke" may be treated as a point.

Input: Pattern information, for example, stroke information as converted from handwriting to a form acceptable for introduction into recognition apparatus. Input is generally electrical, generated, for example, in terms of x-y coordinate values as produced by tablet/writing utensil or other input equipment. Sound may constitute a form of input.

Template: Information in memory which defines, e.g., strokes with which input is compared to yield a label. Templates include permitted deviation values on a point-by-point basis.

Label: Formalized designation of input stroke upon meeting designated criteria in comparison with templates.

Stroke Category Label: All labels used to define templates. Labels may be specific to a single recognizable stroke, as well as inclusive of groupings of separately identifiable strokes (which are either difficult to resolve or which need not be resolved in the interest of frugality. Such labels identify confusion groups of strokes.)

Dictionary: Listings in a memory of strings of identifiers, specifically stroke strings, corresponding to acceptable patterns. In the preferred embodiment, dictionary entries are sequences of labels representing ordered strings. Ordinarily, the number of entries exceeds the total vocabulary, since variations may be listed separately. Such variations include variations in stroke label sequence, as well as in stroke count (in which formal strokes are commonly segmented or interconnected to increase or decrease count).

Algorithmic Part: That part of the recognition process in which rules are applied uniformly to groups of patterns larger than those contained within confusion sets. Rules may be applied uniformly—e.g., to all patterns, or to all patterns of a given stroke count. In an illustrative embodiment the algorithmic part includes inputting through (first) dictionary matching. While useful for tutorial purposes, order of processing does not affect accuracy so that algorithmic may follow non-algorithmic or routines may be interspersed.

Confusion Set: Multiple characters in the dictionary which satisfy matching criteria during dictionary matching assuming algorithmic processing only and are in consequence presented for disambiguation.

Disambiguation: (or non-algorithmic phase). Routines associated with each dictionary entry intended to eliminate all but a unique confusion set member. In forward processing disambiguation is applied for each entry in a confusion set. In other processing order disambiguation routines may be more generally applied.

Vocabulary: Complete group of patterns which may be input for processing.

Vocabulary Sets: Members of the vocabulary which have characteristics in common and which are treated similarly during algorithmic processing—e.g., in the preferred embodiment in which processing is based on realtime stroke identification, vocabulary sets include all patterns of a particular stroke count.

4. Specific Embodiments:

This section is in terms of the recognition stage whereby introduced characters are identified during a dictionary search by matching with stroke and character information already in memory. It has been stated that preferred embodiments rely upon assignment of stroke labels in a stroke-by-stroke "real-time" manner to yield a sequenced train of labels used in the dictionary matching. Description is in these terms.

Figures 1, 2A, 2B:
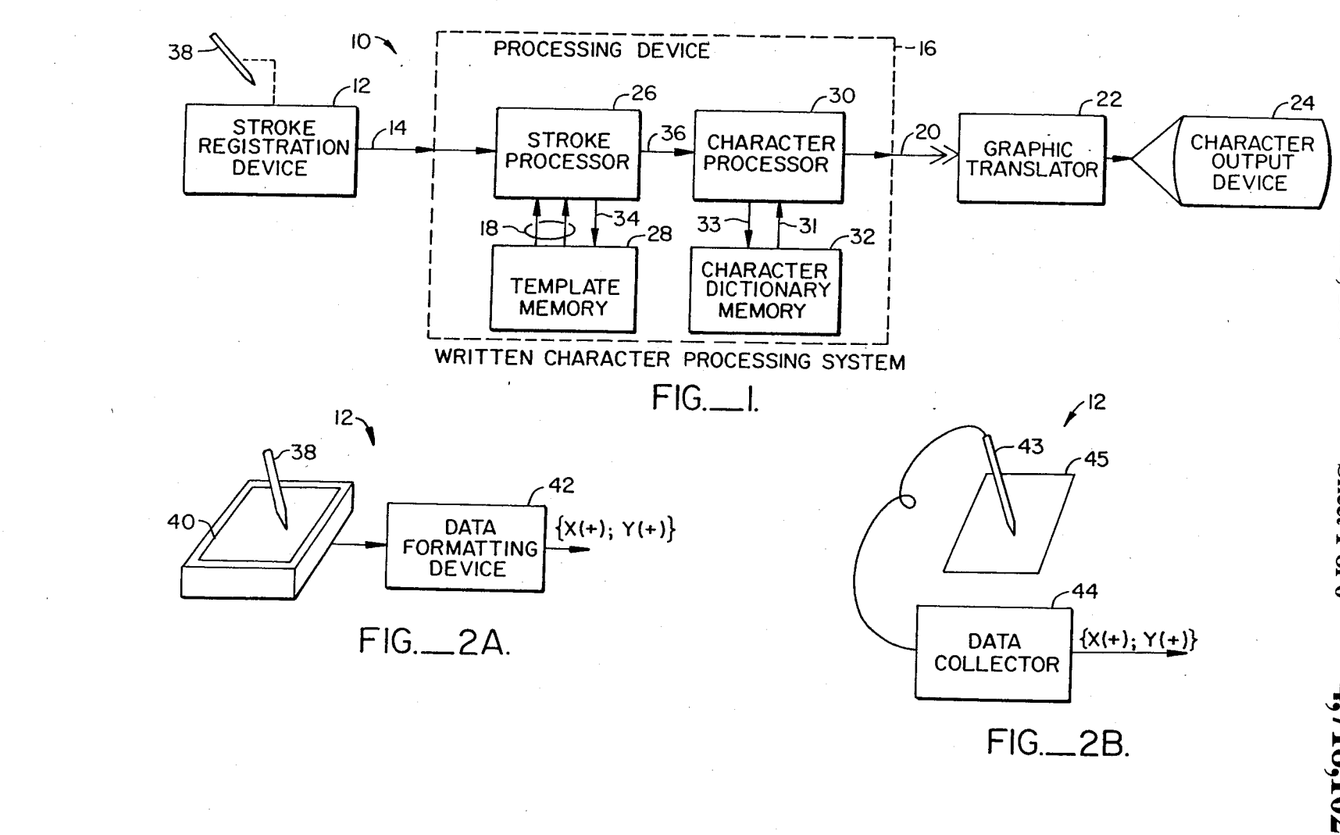
FIG. 1 is a block diagram of a written character processing system according to the invention.
FIG. 2A is a pictorial block diagram of one type of stroke registration means for use in accordance with the invention.
FIG. 2B is a pictorial block diagram of a second stroke registration means for use in accordance with the invention.

Referring to FIG. 1, a preferred embodiment 10 according to the invention is shown.

According to a specific embodiment of the invention, the data processing means 16 includes means for designating from first signal information a set of selected first data points along the stroke under examination. The curvature characteristics of the stroke under examination are specified by coordinates in a reference system for use in labeling the stroke with an identifying label. In addition, according to the invention, second signal information describing the template strokes takes the form of stroke templates. A stroke template is, in a specific embodiment, two ordered sets or pairs of values at locations or second data points along a model stroke, the first value of the pair defining relative position and the second value of the pair defining a permissible deviation value for each position.

The permissible deviation values are designed for flexibility. They may differ from stroke to stroke and from location to location along a stroke, a greater permissible deviation value corresponding to greater permissible tolerance in relative position of points along a model stroke. In the data processing means 16 the position of the first data points are compared with the positions of corresponding second data points, and then the permissible deviation values are used in a matching scheme to determine which stroke template produces the best correspondence with the stroke under examination. It is the purpose of the invention to enhance pattern identification accuracy and to decrease ambiguity among possible solutions by selective disregard of information about the characteristics of the stroke under examination. It has been determined that too much information about position, for example about position of certain parts of a stroke, can be as detrimental to identification as too little information in certain processing techniques. Yet it has been discovered that the information should be accurately registered even if the entire information is not retained or used in the recognition process.

There are many possible embodiments of the invention. The following description describes the method of the invention in reference to a specific apparatus according to the invention.

The processing means 16 includes a stroke processor 26, a template memory 28, a character processor 30 and an index memory, specifically a character dictionary memory 32. The template memory 28 is responsive to a signal on a template address select line 34 to provide second signals on second signal lines 18 to the stroke processor 26. The stroke processor 26 is operative to identify the stroke represented by the first signal information based on the second signal information in accordance with specific embodiments of the invention.

Third signals representing third signal information are provided at the output of the stroke processor 26 by a stroke label line 36 coupled to the character processor 30. The character dictionary memory 32 is responsive to a signal on a character address select line 33 to provide fourth signals on a character label line 31 to the character processor 30. The character processor 30 identifies the character represented by a collection of identity label signals. The identity label signals may represent labels for a specific stroke, or they may represent labels for a confusion group of strokes. Character label signals are provided as output information at the output of the character processor 30 on the output signal line 20.

The stroke registration device 12 is responsive to handwritten input by means of a writing implement 38. Turning to FIGS. 2A and 2B, there are shown two alternatives for the stroke registration device 12. In FIG. 2A, the stroke registration device 12 comprises a conventional writing implement 38 and x-y data entry tablet 40. The tablet 40 in combination with conventional data formatting means 42, which may be built into the tablet 40, provides as an output a digital representation of each stroke of a character written on the face of the tablet by the writing implement 38, such as a pen or a stylus. The digital representation of each stroke consists of a sequence of x and y coordinate pairs sampled in time. A typical rate of coordinate pairs is one hundred coordinate pairs per second.

Alternatively, the stroke registration means 12 may be an instrumented stylus 43, friction writing surface 45 and data collection means 44, as generally disclosed in connection with U.S. Pat. No. 4,040,010 to Crane et al.

The instrumented stylus 43 acting as a pattern-forming means may be provided with strain gauge transducers to sense pressure in a horizontal (x), vertical (y) and normal (z) directions, the pressures being sampled in time as pressure is applied to the writing surface 45 acting as a pattern-accommodating means to generate a sequence of x and y force signal pairs sampled in time in substantially the same form as that produced by an x-y tablet. Other forms of data input may be provided to the data processing means 16 so long as the relative position of points along a stroke are registered thereby to specify the curvature characteristics.

Figure 3:
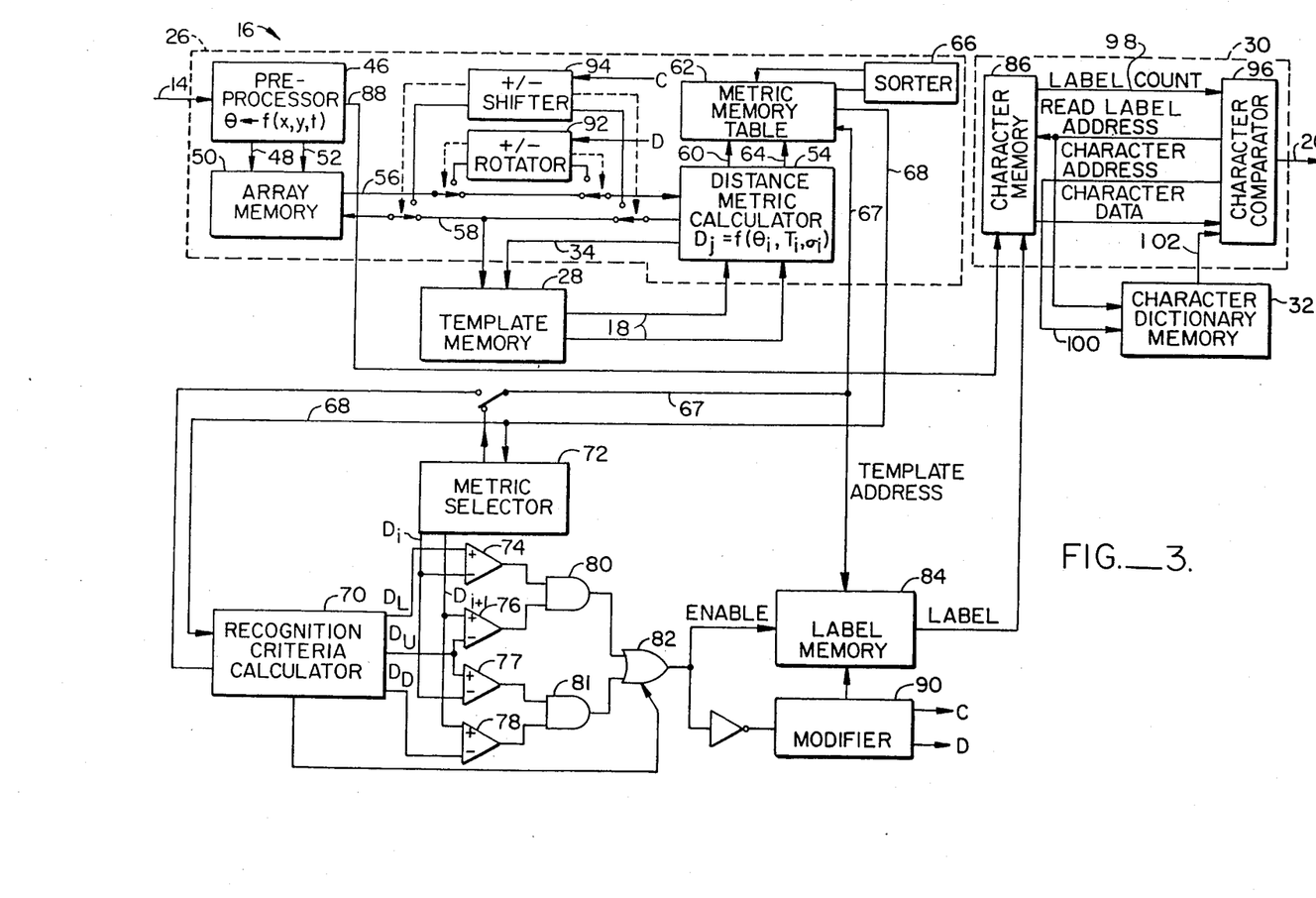
FIG. 3 is a block diagram of a processing device operative in accordance with the invention.

Turning to FIG. 3, there is shown a representative processing means 16 operative in accordance with one embodiment of the invention. First signals 14 are coupled to a preprocessor 46 of the stroke processor 26. The preprocessor 46 may drop end points and then perform an interpolation and conversion to obtain a standardized representation of each stroke in which the only variable is an angle parameter. Herein this form is referred to as a polar representation. Specifically, the raw data in the form of a stream of x-y coordinate pairs generated as a function of time are transformed into a standard number of x-y coordinate pairs, typically thirty, as if spaced evenly along the length of a stroke under examination. The precise values of the x and y coordinates are interpolated from the raw data as if strokes were drawn at a constant rate. Selected ones of the interpolated x-y coordinate pairs may be stored for later use in the event that relative stroke position within a character is subsequently needed. The interpolated x-y coordinate pairs are converted to a plurality of standard length vectors with specific angle values calculated with high precision at equally spaced distance increments along the contour of the stroke under examination. Each angle value is calculated according to the following equation:

$$\theta_{i+1} = \arctan\left(\frac{y_{i+1} - y_i}{x_{i+1} - x_i}\right) \tag{1}$$

where each angle value is one of an ordered set of angle values describing the contour of the stroke. The angle value is typically resolved to about 1.5° and preferably to about 0.15°. The spacing between sample points is standardized, typically on the order of 1/30th of the length of the stroke, so that data about the length of each vector need not be stored.

Implicit in the operation of the preprocessor 46 are size and speed normalization. Any two strokes which have the same basic form and which differ only in overall size or in the time required to register the stroke have essentially the same polar representation.

The output of the preprocessor 46 is provided via data line 48 to an array memory 50. The data line 48 is a bus which carries the angular position value signals. A write address line 52 may be coupled from the preprocessor 46 to the array memory 50 to provide the stroke point address or point number of the corresponding angular position value data. The array memory 50 generally has capacity to store all of the curvature information for an entire character. Each character is normally stored in stroke sequence. Thus, the array memory 50 may be a simple shift register which is operative on a first-in first-out basis, thus eliminating the need for an explicit write address line.

It is normally necessary to segment the character information into strokes and the total information into characters. Stroke segmentation may be implemented with start/stop signals indicating the beginning and end of each stroke of a stroke registration sequence. Character segmentation may be implemented by either start/stop signals or by elemental spatial sensing, i.e., by registering a single character per spatial registration field, as in a matrix of boxes on an x-y tablet. A limited amount of absolute position information may be extracted from the raw data and may be used for the purpose of character segmentation. Notwithstanding, absolute position information need not be used for initial stroke recognition processing.

The data output of the array memory 50, in the form of the angular values is provided to a distance metric calculator 54 via data line 56. The distance metric calculator 54 generates read address information through a read address line 58 to the array memory 50. A metric is a function which specifies the separation between any two contours based on angular position. The purpose of the distance metric calculator 54 is to compute the closeness of the curvature characteristics of a stroke under examination to each one of a set of preselected stroke templates. The stroke templates according to the invention are stored in stroke template memory 28 in the form of a two column array of precise angular position values in polar coordinates $T_i$, representing vectors of constant length tangential to the stroke, and corresponding permissible deviation values. The deviation values are represented by the Greek symbol $\sigma_i$ and represent permissible deviation in the angular position values $T_i$.

Figure 5:
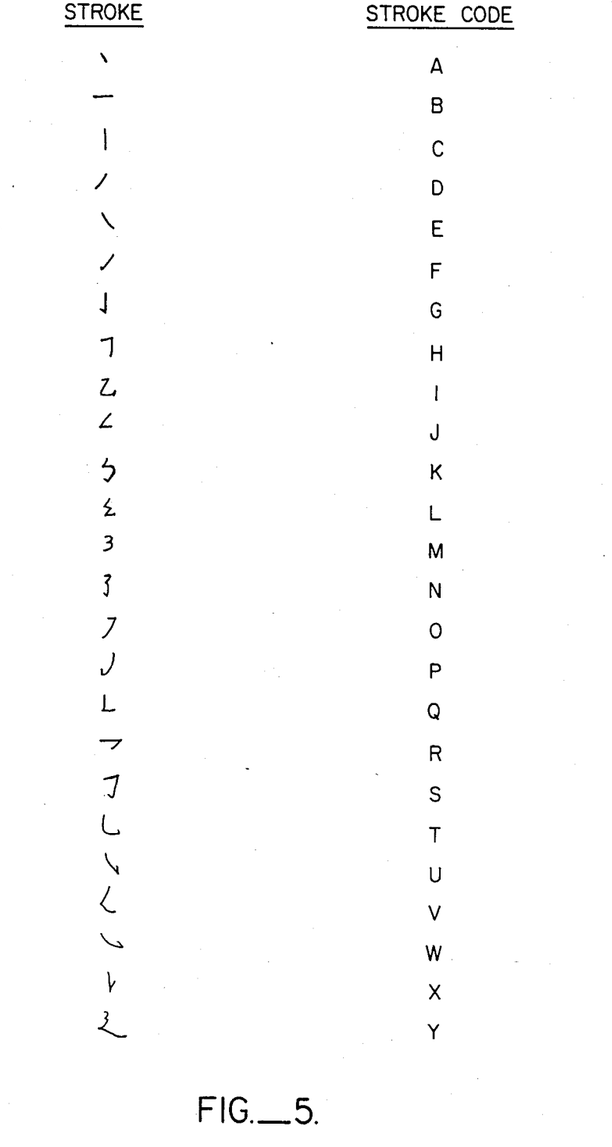
FIG. 5 is a table of strokes illustrating templates in accordance with the invention.

According to the invention, a set of template strokes is empirically defined, and each template stroke is described by a stroke template which is specified in terms of an angular position value and a permissible angular deviation value at each data point along the template stroke. The template data points or second data points are selected to correspond with the first data points, or data points of the stroke under examination in both number and position. FIG. 5 gives pictorially a representative set of the template strokes empirically derived from the Kanji. A stroke code, that is, an identity label, has been arbitrarily assigned to each one of the stroke templates. The stroke code may be an ASCII character or the like which is suitable for data storage.

The distance metric for each template is calculated in one of two ways. In the first alternative, the difference in angular displacement between the stroke under examination and the template is calculated by subtracting the angular position value of each first data point from the angular position value of the corresponding second data point to obtain an absolute value and then dividing the resultant difference value by the corresponding permissible angular deviation value for that data point to obtain a quotient value at each data point. All quotient values thereby obtained are summed to obtain a single distance metric value for each template relative to the stroke under examination. This distance metric is represented by the expression:

$$D_i = \sum_{j=1}^{N} \frac{|\theta_j - T_j^i|}{\sigma_j^i} \tag{2}$$

$D_i$ is the distance metric for the $i^{th}$ template,
$\theta_j$ is the angular position value of each first data point, $T_j^i$ is the angular position value of the second data point for the $i^{th}$ template and $\sigma_j^i$ is the permissible angular deviation value for the corresponding second data point of the $i^{th}$ template.

As an alternative, the quotient values are each squared prior to summation. This distance metric may then be represented by the expression:

$$D_i = \sum_{j=1}^{N} \left[ \frac{\theta_j - T_j^i}{\sigma_j^i} \right]^2 \quad (3)$$

The distance metric calculator 54 draws its angular position and permissible deviation values for each second data point of the templates from the stroke template memory 28 through second signal lines 18. Metric values are provided through a metric data line 60 to a metric memory table 62. The metric data is sorted in the metric memory table 62 in order from least to greatest. A write address line 64 conveys the initial address signals from the distance metric calculator 54 to the table 62. A sorter 66 coupled to the table 62 may be employed to rearrange the order of the data.

The sorted metric data output of the table 62 is coupled via a data line 68 to a recognition criteria calculator 70 and to a metric selector 72. Recognition criteria are applied according to the invention to verify whether the least distance metric so obtained actually corresponds to a predefined stroke of predefined category of strokes. The recognition calculator 70 compares the least distance metric $D_i$ and at least the next least distance metric $D_{i+1}$ with three threshold criteria, an upper decision threshold $D_U$, a lower decision threshold $D_L$, and a difference decision threshold $D_D$. The upper decision threshold $D_U$ and the lower decision threshold $D_L$, as well as the difference decision threshold $D_D$ are assigned values based on preselected tolerance levels. The lower decision threshold $D_L$ is the size of the largest acceptable minimum distance metric for the template of interest. The upper decision threshold $D_U$ is the smallest permissible distance metric for the second least distance metric of the set. The difference decision threshold $D_D$ is the sum of the least distance metric and a predetermined separation $D_d$. These three decision criteria are compared with the preselected least and next least distance metrics in first comparator 74, second comparator 76, third comparator 77 and fourth comparator 78. First comparator 74 yields a positive indication if the least metric $D_i$ is less than the lower decision threshold $D_L$. The second comparator 76 yields a positive logic indication if the next least distance metric $D_{i+1}$ is greater than the upper decision threshold $D_U$. The outputs of the first and second comparators 74, 76 are provided to an AND gate 80 so that the joint positive logic conditions indicate stroke recognition. The third comparator 77 yields a positive logic signal if the value of the least distance metric $D_i$ is less than the upper decision threshold $D_U$. The fourth comparator 78 yields a positive logic value if the value of the second least distance metric $D_{i+1}$ is greater than the difference decision threshold $D_D$, where $D_D = D_i + D_d$. The output of third comparator 77 is provided together with the output of the fourth comparator 78 to an AND gate 81 so that the joint positive logic conditions indicate stroke recognition. The outputs of AND gates 80 and 81 are coupled to an OR gate 82. If either of the criteria is satisfied, then the system 26 indicates it has recognized the stroke under examination. A stroke label memory 84 is enabled by the output of OR gate 82, and the stroke label of the template corresponding to the least metric $D_i$ meeting the criteria is loaded into a character memory 86 at the current stroke address, as indicated by write stroke address line 88.

In the event the recognition criteria are not met and the least metric is not accepted, the stroke label memory 84 is not enabled during the first pass of metric calculation. Instead, a stroke modifier 90 is enabled which controls a data rotator 92 and a data point position shifter 94. The data rotator 92 is operative to add or subtract an incremental value to the angular position value stored in the array memory 50 before it is supplied to the distance metric calculator 54. The stroke processor 26 then performs the same functions as before until the OR gate 82 yields either a positive or negative recognition indication. A negative recognition indication causes the stroke modifier 90 to enable the position shifter 94. The position shifter 94 operates to add or subtract a value in the address of the stroke data points, thereby effectively shifting the first data points along the length of the stroke relative to the second data points. The stroke processor 26 then processes the modified data until the OR gate 82 yields a recognition indication. In the event of a negative indication, the stroke modifier instructs the stroke label memory 84 to place a question mark in the character memory 86 at the position of the stroke under examination, thereby to indicate that the stroke was not one of the recognized set of strokes. The rotation or shifting may be implemented in any order and in multiple steps.

The lack of stroke recognition may not be detrimental to character recognition. An unknown stroke at the designated position in the character memory may optionally be treated as a free or blank stroke. A position for the stroke may be reserved without assigning an identity label.

The character processor 30 includes the character memory 86 and a character comparator 96 to which the character dictionary memory 32 is coupled. Character data via a character data line 98 is communicated from the character memory 86 to the character comparator 96 in response to presentation of a read stroke address to the character memory 86. The character comparator 96 iterates through the character dictionary memory 32 by presenting a character address to the character dictionary memory 32 through a character address line 100. Labels of corresponding strokes of the addressed character and the character under examination are presented to the character comparator 96 through a character dictionary line 102 in response to the character address and stroke address. The character comparator 96 is operative to compare the stroke labels from the character memory 86 with the stroke labels from the dictionary memory 32 to provide as its output a third signal in the form of a character label whenever a character is recognized.

In Kanji recognition system, the character dictionary may be arranged efficiently in groups of characters by the number of strokes per character, each character being described by character labels set out in stroke sequence. The stroke count is derived from the character memory 86. The character dictionary may be developed from empirical experience based on the examination of the practices of various native writers. A single character may be represented by a number of alternative character sequences, thereby taking into account sequence and stroke differences while retaining the advantage of information inherent in sequence.

A particularly powerful tool of this invention is the distance metric calculator 54 and stroke template set wherein the stroke template set comprises both position information and permissible deviation information. This form of template allows selective disregard for certain input information about a stroke and eliminates the need for a large number of templates to take into account stroke variations which do not satisfy the precise position criteria and yet which most nearly satisfy the general template criteria. Another powerful tool of the invention is the use of an angular or polar representation at equidistant points along a stroke to characterize the curvature of the stroke. This tool simplifies character processing at the earliest stages by eliminating unnecessary variables such as vector length.

Figure 4:
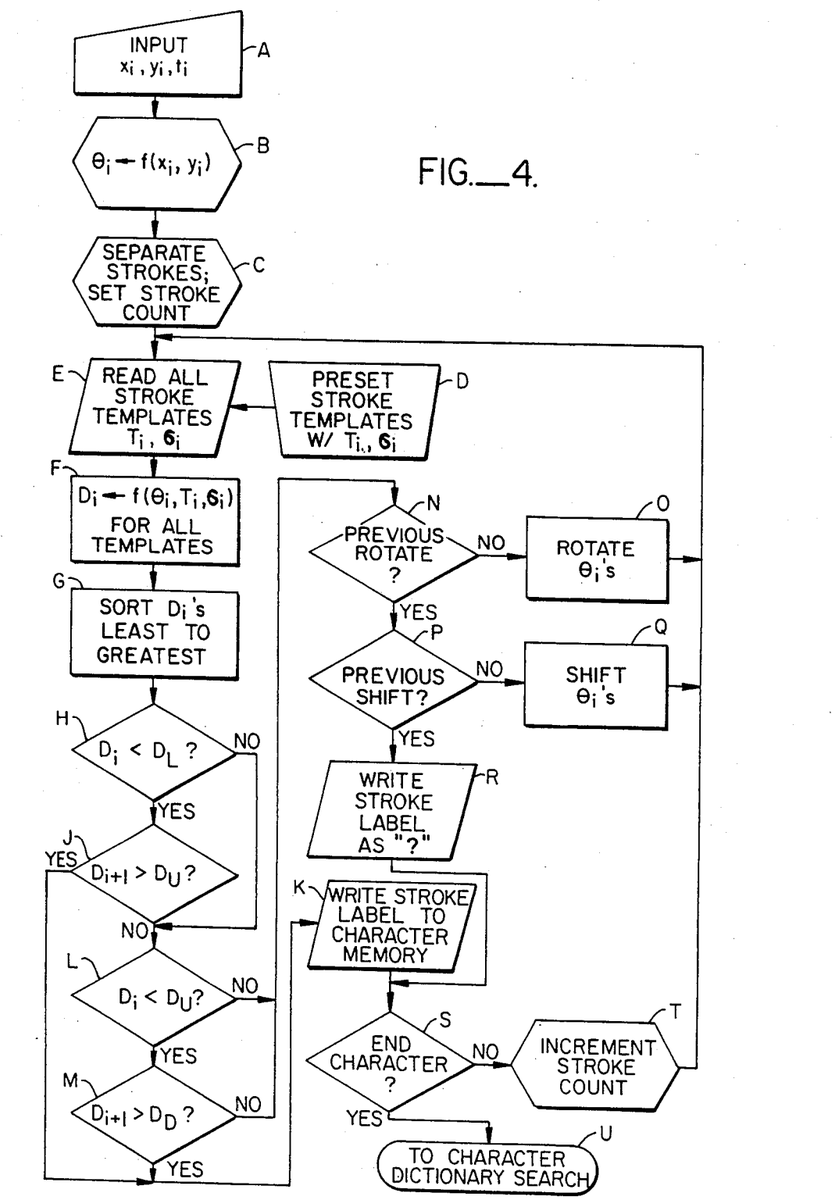
FIG. 4 is a flow chart of the method according to the invention.

Referring now to FIG. 4, there is shown a flow chart for one computer implementation of a specific system according to the invention. Initially, position data as a function of time are manually input, generally in the form of pairs of points x and y at sample times t (Step A). The string of position functions is thereafter converted to a string of vectors of precise polar values at preselected sample points along a standard stroke (Step B). The string of vector values is then separated into sets, each set representing a stroke. A stroke counter may be set to keep track of the number of strokes in a character (Step C). Stroke templates have been preset in the form of a string of vector values $T_i$ and deviation values $\sigma_i$ (Step D). All stroke templates are then read (Step E), and the distance metrics for all templates with respect to a particular stroke under examination are calculated (Step F). Thereafter, the distance metrics are sorted in order from least to greatest (Step G). The least distance metric corresponds to the most likely candidate label for the stroke under examination. However, recognition criteria are applied according to the invention to enhance the likelihood of accurate recognition. First, the least distance metric is compared with the lower decision threshold (Step H). If the indication is that the least distance metric $D_i$ is less than the lower decision threshold, $D_L$ the next least distance metric $D_{i+1}$ is compared with the upper decision threshold $D_U$ to see if the next least distance metric $D_{i+1}$ exceeds the upper decision threshold $D_U$ (Step J). If the indication is positive, then the system writes the stroke label corresponding to the least distance metric to the character memory indicating acceptance and thus recognition of the stroke (Step K). If the indication of either of the previous threshold level tests is negative, an alternative decision process is applied. First, the least distance metric $D_i$ is compared with the upper decision threshold $D_U$ to see if the metric $D_i$ is less (Step L). If yes, then the next least distance metric $D_{i+1}$ is compared with the difference decision threshold $D_D$ to see if the threshold $D_D$ is exceeded. The difference decision threshold $D_D$ is the sum of the least distance metric $D_i$ and the preselected separation $D_d$ (Step M). If the indication is positive, then the system indicates that it has recognized the stroke (Step K).

If the decision indication is negative in either of the previous cases, then the system implements shift and/or rotate processing to realign the data or to rotate the values of the data (Steps N,O and P,Q). The steps are repeated from the read in of the templates (Step E) until a decision is made. If none of the decision threshold criteria are met, the system ultimately writes the identity label as a question mark (Step R), and then the system goes to the next stroke. If the stroke is not the last stroke (Step S), then the stroke count is incremented (Step T) and the process is repeated for the next stroke. If the stroke is the last stroke, then the system conducts the character dictionary search (Step U) to identify the character. (In some embodiments, the dictionary search may be instituted before stroke labeling is completed.)

Figure 6:
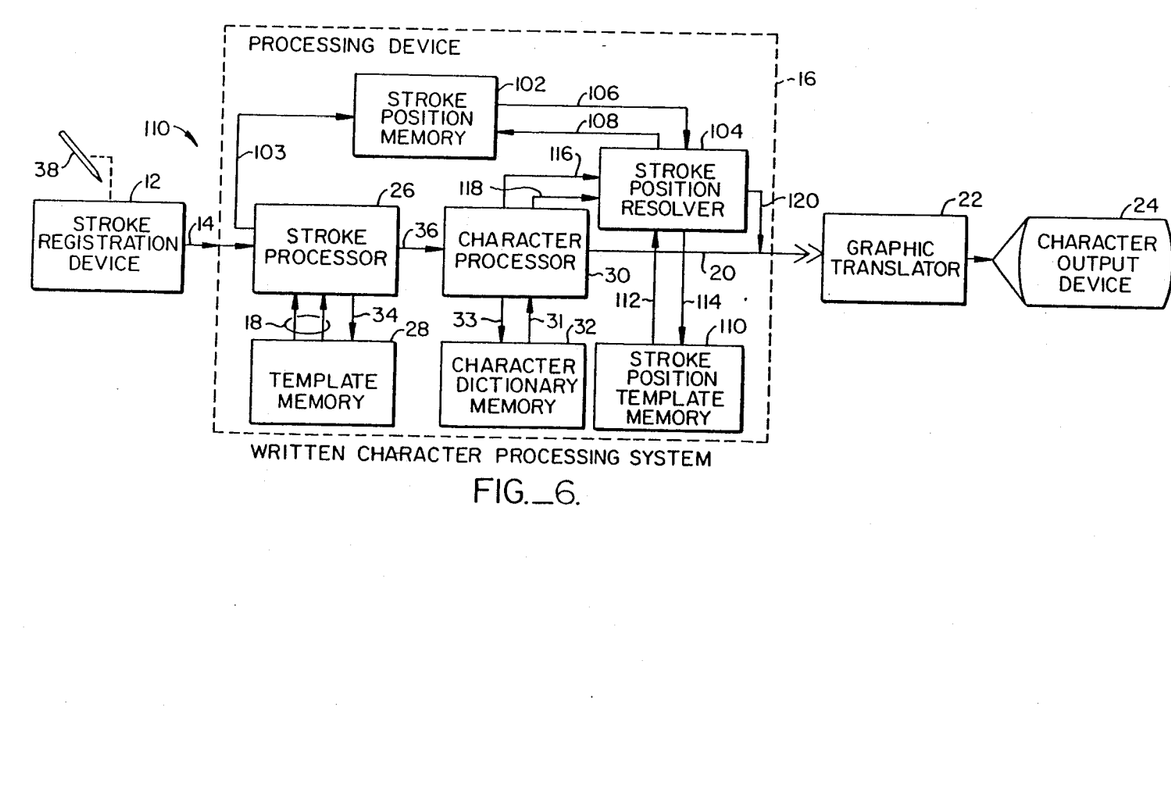
FIG. 6 is a block diagram of an alternative embodiment of a written character processing system according to the invention.

Referring to FIG. 6, an alternative handwritten character recognition system 110 is shown which is similar to the system 10 of FIG. 1. Identical elements are designated by the same numerals.

According to another aspect of the invention, the data processing means 16 includes means for comparing the first signal information with second signal information independent of stroke position and further independent of stroke size to obtain an identification of the stroke under examination. Only the curvature characteristics of the stroke under examination are specified, and generally to a relatively high degree of accuracy, for use in identifying and labeling the stroke. A limited amount of position information about each stroke may be stored in a stroke position memory 102 for possible later use after the identity label has been assigned to the stroke under examination.

The processing means 16 includes a stroke processor 26, a stroke template memory 28, a character processor 30 and a character dictionary memory 32. The stroke template memory 28 is responsive to a signal on a template address select line 34 to provide second signals on a second signal line 18 specifying a template address to the stroke processor 26. The stroke processor 26 identifies the stroke represented by the first signal information based on the second signal information. The first signal information applied to the stroke process 36 may be stripped of information regarding stroke position relative to related strokes, since relative stroke position plays no part of the initial stroke recognition process. An identity label signal is provided at the output of the stroke processor 26 by a stroke label line 36 to the character processor 30. The character dictionary memory 32 is responsive to a signal on a character address select line 33 to provide signals on a character label line 31 to the character processor 30. The character processor 30 identifies characters as represented by a collection of identity label signals. When a single character has been identified and accepted, a character label signal is provided at the output of the character processor 30 on the third signal line 20. A graphic translator 22 converts the character label signals to a display signal and the output device 24 displays or presents the character. In the event more than one character is found to match the set of identity label signals employed to search the character dictionary, all are displayed and a stroke registration device 12 may then be used by an operator to indicate which of the displayed characters is to be accepted as the intended character. Upon receipt of such an identification or upon default, the intended character is then registered or otherwise used in a data processing sequence.

Where the character processor 30 identifies that more than one character corresponds to a single identity label sequence, automatic means may also be provided for distinguishing among characters. For example, a stroke position resolver 104 may be provided which generally operates under control of the character processor 30 to receive selected information regarding positions of strokes relative to one another from stroke position memory 102 through data line 106 upon a signal through address line 108. The stroke position resolver is operative to receive selected relative stroke position information about tentatively identified characters from a stroke position template memory 110 through data line 112 upon receipt of a signal through address line 114. The template memory 110 contains a limited amount of information about relative positions of selected strokes of characters which are likely to be confused, such as relative position of key points in a reference plane. Data and control lines 116, 118 from the character processor 30 activate the stroke position resolver 104 to produce a character identity label through output line 120. Information regarding stroke position may be extracted from the stroke processor 26 prior to stroke processing and provided to the stroke position memory 102 through an input line 103. The stroke registration device 12 is responsive to handwritten input by means of a writing implement 38.

Figure 7:
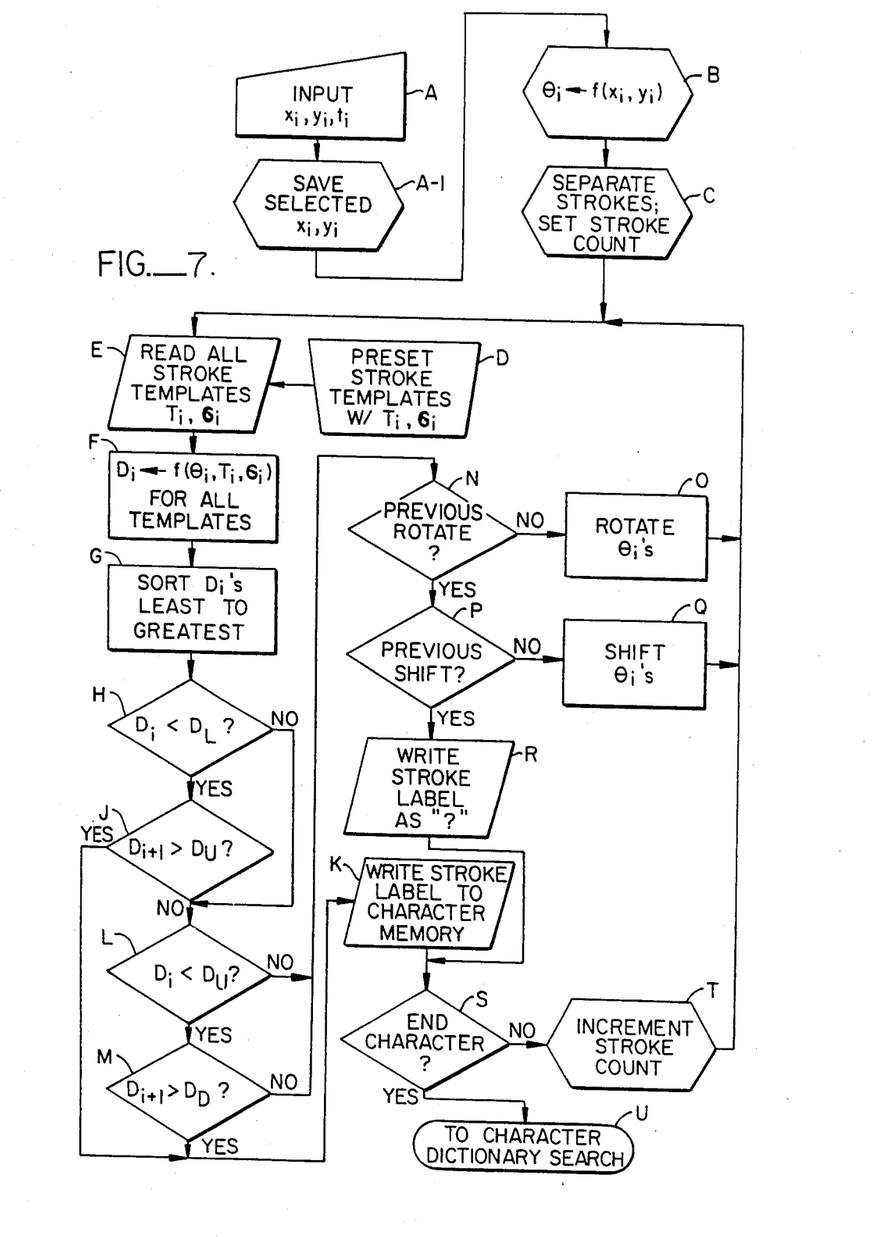
FIG. 7 is a flow chart of an alternative method according to the invention.

Referring now to FIG. 7, there is shown a flow chart for another computer implementation of the stroke recognition portion of the system according to the invention. Initially, position data as a function of time are manually input, generally in the form of pairs of points x and y at sample times t (Step A). There follows the storage of selected positional information for possible later use (Step A-1) and the conversion of the string of position functions to a string of angular values at preselected sample points along a standard stroke, without reference to position (Step B). The string of vector values is then separated into sets, each set representing a stroke. A stroke counter may be set to keep track of the number of strokes in a character (Step C). Stroke templates have been provided in the form of a string of polar coordinate angular values $T_i$ and deviation values $\sigma_i$ (Step D). All stroke templates are then read (Step E), and the distance metrics for all templates with respect to a particular stroke under examination are calculated (Step F). Thereafter, the distance metrics are sorted in order from least to greatest (Step G). The least distance metric corresponds to the most likely candidate for the recognized stroke. However, recognition criteria are applied according to the invention to enhance the likelihood of accurate recognition. First, the least distance metric is compared with the lower decision threshold (Step H). If the indication is that the least distance metric $D_i$ is less than the lower decision threshold, $D_L$, then the next least distance metric $D_{i+1}$ is compared with the upper decision threshold $D_U$ to see if the next least distance metric $D_{i+1}$ exceeds the upper decision threshold $D_U$ (Step J). If the indication is positive, then the system writes the identity label to the character memory indicating recognition of the stroke (Step K). If the indication of either of the previous threshold level tests is negative, an alternative decision process is applied. First, the least distance metric $D_i$ is compared with the upper decision threshold $D_U$ to see if $D_i$ is less than $D_U$ (Step L). If yes, then the next least distance metric $D_{i+1}$ is compared with the difference decision threshold $D_D$ to see if the threshold $D_D$ is exceeded. The difference decision threshold $D_D$ is the sum of the least distance metric $D_i$ and the preselected separation $D_d$ (Step M). If the indication is positive, then the system indicates that it has recognized the stroke (Step K).

If the decision indication is negative in either of the previous cases, then the system activates the shift and/or rotate processors to realign the data or to rotate the values of the data (Steps N,O and P,Q). The steps are repeated from the read in of the templates (Step E) until a decision is made. If the decision threshold criteria are not met, the system writes the stroke label as a question mark (Step R), and then the system goes to the next stroke. If the stroke is not the last stroke (Step S), then the stroke count is incremented (Step T) and the process is repeated for the next stroke. If the stroke is the last stroke, then the system conducts the character dictionary search (Step U) to identify the character. The character dictionary search is conducted as described above.

The dictionary search is an element of the algorithmic part of the processing in the forward direction (one embodiment of the invention). During a dictionary search, a significant number of dictionary entries are designated as potentially representative of the input character. The non-algorithmic routines are then applied to the designated entries to disambiguate and thus identify the input character with a single character designation in the vocabulary.

FIGS. 8, 9, and 10 illustrate three patterns which correspond to dictionary entries which may be confused during a dictionary search. FIG. 8 is a first pattern 200 corresponding to a particular nineteen-stroke version of a pattern corresponding to the JIS-1 character (24,60). It is assumed that this pattern is input by the writer. During a dictionary search based solely on stroke strings, the illustrated nineteen-stroke version of JIS-1 character (34,01) 202 (FIG. 9) and the illustrated nineteen-stroke version of JIS-1 character (44,86) 204 (FIG. 10) would generally also be designated as belonging to the same confusion set as the pattern 200. (A small confusion set has been chosen for ease of illustration. Normally the confusion set would be much larger.) The basis of this confusion set may be seen by comparing the first few strokes in the stroke string. The first stroke of each pattern 200, 202 and 204 is generally vertical, and the coding (not shown) for the first stroke is sufficiently loose to accept a generally vertical pattern. The second stroke is shaped as a combination of a top horizontal and a right side vertical segment of indefinite length. The third stroke is generally horizontal with an accepted angular range.

The fourth stroke is instructive. In pattern 200, the fourth stroke is a particular type of vertical stroke and the allowed coding includes a vertical stroke. In pattern 202 the fourth stroke is horizontal. However, it is coded to also accept a vertical stroke pattern at this position because it is so short. In pattern 204, the fourth stroke is a true vertical and is so coded. As much looseness as is necessary to accomodate natural writing can thus be built into the coding for the dictionary.

Once the confusion set has been identified, the nonalgorithmic processes are applied to selected elements of each designated entry. For each designated entry, corresponding disambiguation routines are applied to compare relative positions of strokes, groups of strokes, or radicals or of any positions within a stroke or strokes. Other disambiguation routines may measure for example contour length, intercepts, or level of stroke complexity. To identify a character, every disambiguation routine associated with at least one entry representative of the character must produce a true indication and at least one disambiguation routine associated with each other entry in the confusion set must produce a false indication.

As examples of disambiguation routines which are true for character 200 but not for characters 202 and 204 consider the following:

1—The lower of the lowest point of strokes 2 and 3 is higher than the highest point of the set of lowest points in strokes 7, 8, 9 and 10.

2—The lower of the lowest point of strokes 5 and 6 is higher than the highest of the set of lowest points of strokes 8, 9 and 10.

These two statements are both true only for the entry corresponding to pattern 200 (which is character 24,60) even with reasonable ranges of distortion in the input pattern. The first statement is false for pattern 202 and barely false for pattern 204. However, the second statement is clearly false for pattern 204. In this manner the input pattern is clearly identified with intended pattern 200 and a signal indicating pattern 200 is thereupon provided to an output utilization device.

The invention has now been explained with reference to specific embodiments. Other embodiments will be apparent to those of ordinary skill in the art. It is therefore not intended that this invention be limited except as indicated by the appended claims.

What is claimed is:

1. Apparatus for pattern processing, said apparatus comprising means for receiving first signal information derived from information comprising handwritten patterns, and data processing means provided with pre-stored second signal information for uniquely differentiating said handwritten patterns from patterns within a pattern vocabulary, said vocabulary being made up of one or more vocabulary sets with a set defining patterns with at least one common characteristic within which differentiation is restricted during at least a portion of processing, said second signal information being arranged to accomplish pattern processing by routines comprising algorithmic routines in which all patterns within at least a vocabulary set are processed similarly and disambiguation routines in which patterns are processed in terms of characteristics of specific patterns, in which use of algorithmic routines alone without disambiguation routines would yield confusion sets, said sets consisting of patterns confused with each other and in which use of both algorithmic routines and disambiguation routines yields uniquely differentiated patterns and second signal information including a dictionary containing the vocabulary and provision for matching information derived from said first signal information with dictionary entries within the appropriate set, characterized in that said algorithmic routines if used alone without any disambiguation routines results in at least 50 percent of all patterns within the pattern vocabulary being in confusion sets, each said set containing an averave of at least two patterns, and in which the said disambiguation routines include non-uniform, customized routines selected to distinguish members within confusion sets, while at the same time surviving handwriting variations, whereby said data processing means comprises means for producing unique character recognition.

2. Apparatus of claim 1 in which data processing means is designed to result in "forward processing" in which algorithmic routines are applied initially in an algorithmic part which terminates in dictionary matching to actually yield said confusion sets followed by disambiguation routines in a non-algorithmic part to yield a uniquely differentiated pattern within each said confusion set.

3. Apparatus of claim 1 in which processing means in designed such that at least one disambiguation routine precedes at least one algorithmic routine.

4. Apparatus of claim 3 in which confusion sets are not actually yielded.

5. Apparatus of claim 1 in which confusion sets contain an average of at least three patterns.

6. Apparatus of claim 1 in which confusion sets contain an average of at least four patterns.

7. Apparatus of claim 1 in which the said pattern vocabulary contains at least 2,000 patterns and in which at least 90 percent of all patterns in the pattern vocabulary are in confusion sets, said confusion sets containing an average of at least 5 patterns.

8. Apparatus of claim 7 in wich the pattern vocabulary contains at least 3,000 patterns and in which at least 14 out of 15 of all patterns in the pattern vocabulary are in confusion groups, said confusion sets containing an average of at least 7½ patterns.

9. Apparatus of claim 1 in which the pattern vocabulary contains in excess of 800 patterns and in which the minimum number of patterns per confusion set is increased linearly as the vocabulary size increases above 800.

10. Apparatus of any one of claims 1 through 9 in which the minimum number of patterns per confusion set is increased by 50 percent over the minima expressed in such claims.

11. Apparatus of any one of claims 1 through 9 in which the minimum number of patterns per confusion set is increased by 100 percent over the minima expressed in such claims.

12. Apparatus to claim 1 in which said means for receiving first signal information comprises a pattern registration means.

13. Apparatus of claim 12 in which said first signal information is coordinate information consisting of pluralities of spaced points.

14. Apparatus of claim 13 in which points are equally temporally spaced and in which the said data processing means converts such first signal information into points separated by equally spaced distance intervals.

15. Apparatus of claim 1 in which said first signal information includes stroke information.

16. Apparatus of claim 15 in which said second signal information includes stroke information.

17. Apparatus of claim 16 in which such stroke information includes permitted tolerances on a point-by-point basis.

18. Apparatus of claim 17 in which such stroke information is in angular terms.

19. Apparatus of claim 18 in which said data processing means includes preprocessing means for recognizing strokes which commonly occur in patterns within the said pattern vocabulary.

20. Apparatus of claim 19 in which said preprocessing means recognizes strokes which approximate straight lines over some substantial portion of their length, such strokes being designated "simple strokes".

21. Apparatus of claim 20 in which the data processing means provides for labeling of any strokes not recognized by the preprocessing means by means of templates containing point-by-point permitted tolerance values.

22. Apparatus of claim 1 in which the algorithmic routines include stroke string processes.

23. Apparatus of claim 22 in which said disambiguation routines includes correlational processes for differentiating characters within confusion sets from all characters within a vocabulary set.

24. Apparatus of claim 1 in which said data processing means includes means for further processing information subsequent to unique pattern recognition.

25. Apparatus of claim 24 in which said means for further processing includes formalized replication of an input character within a medium.

26. Apparatus of claim 25 designed to function as a typesetter.

27. Apparatus of claim 25 designed to function as a typewriter.

28. Apparatus of claim 24 in which said further processing means comprises a computer.

29. Apparatus of claim 28 in which said computer functions as a word processor.

30. Apparatus of claim 1 in which the said dictionary contains pattern variations so that the number of dictionary entries exceeds said pattern vocabulary.

31. Apparatus of claim 30 in which the said first signal information includes strokes, a stroke being defined as a pattern element resulting from continuous contact of pattern forming means and pattern accommodating means, as well as stroke sequence information and in which said pattern variations include stroke sequence variations.

32. Method for pattern processing comprising comparison of input patterns with prestored second signal information in which first signal information derived from information comprising handwritten patterns is input and compared with prestored second information to uniquely differentiate said handwritten patterns from other patterns within a pattern vocabulary, said vocabulary being made up of one or more vocabulary sets, each said set defining patterns with at least one common characteristic within which differentiation is restricted during at least a portion of processing, said pattern processing being by routines comprising algorithmic routines in which all patterns within at least a vocabulary set are processed similarly and disambiguation routines in which patterns are processed in terms of characteristics selected specifically to distinguish numbers of confusion sets while at the same time surviving handwriting variations in which use of algorithmic routines alone without disambiguation routines would yield confusion sets together containing at least 50% of all patterns within the pattern vocabulary, said sets consisting of patterns confused with each other and in which use of both algorithmic routines and disambiguation routines yields uniquely differentiated patterns, said second signal information including a dictionary containing the vocabulary and matching information derived from said first signal information with dictionary entries within the appropriate set, characterized in that said algorithmic routines, if used alone without any disambiguation routines results in at least 50 percent of all patterns within the pattern vocabulary being in confusion sets with each said set containing an average of at least two patterns, whereby said data processing comprises means for producing unique character recognition.

33. Method of claim 32 in which "forward processing" is applied which results in algorithmic routines which are applied initially in an algorithmic part which terminates in dictionary matching to actually yield said confusion sets followed by disambiguation routines to yield a uniquely differentiated pattern within each said confusion set.

34. Method of claim 32 in which at least one disambiguation routine precedes at least one algorithmic routine.

35. Method of claim 34 in which confusion sets are not actually yielded.

36. Method of claim 32 in which confusion sets contain an average of at least three patterns.

37. Method of claim 32 in which confusion sets contain an average of at least four patterns.

38. Method of claim 32 in which said pattern vocabulary contains at least 2,000 patterns and in which at least 90 percent of all patterns in the pattern vocabulary are in confusion sets, said confusion sets containing an average of at least 5 patterns.

39. Method of claim 38 in which the pattern vocabulary contains at least 3,000 patterns and in which at least 14 out of 15 of all patterns in the pattern vocabulary are in confusion groups with such confusion groups containing an average of at least $7\frac{1}{2}$ patterns.

40. Method of claim 32 in which the pattern vocabulary contains in excess of 800 patterns and in which the minimum number of patterns per confusion set is increased linearly as the vocabulary size increases above 800.

41. Method of any one of claims 32 through 40 in which the minimum number of patterns per confusion set is increased by 50 percent over the minima expressed in such claims.

42. Method of any one of claims 32 through 40 in which the minimum number of patterns per confusion set is increased by 100 percent over the minima expressed in such claims.

43. Method of claim 32 in which first signal information is derived from pattern registration means.

44. Method of claim 43 in which said first signal information is coordinate information consisting of pluralities of spaced points.

45. Method of claim 44 in which said first signal information is converted to yield points separated by equally spaced distance intervals.

46. Method of claim 32 in which said first signal information defines strokes.

47. Method of claim 46 in which said second signal information includes stroke information.

48. Method of claim 46 in which such stroke information includes permitted tolerances on a point-by-point basis.

49. Method of claim 48 in which such stroke information is in angular terms.

50. Method of claim 49 in which said first signal information is preprocessed to recognizing strokes which commonly occur in patterns within the said pattern vocabulary.

51. Method of claim 50 in which said preprocessing means recognizes "simple strokes" which approximate straight lines over some substantial portion of their length, such strokes being designated "simple strokes".

52. Method of claim 51 in which strokes not recognized during preprocessing are labeled by comparison with templates containing point-by-point permitted tolerance values.

53. Method of claim 32 in which said algorithmic routines include stroke string processes.

54. Method of claim 53 in which said disambiguation routines include correlational processes for differentiating characters within confusion sets from all characters within a vocabulary set.

55. Method of claim 32 in which processing continues subsequent to unique pattern recognition.

56. Method of claim 55 in which further processing includes replicating an input pattern corresponding with first signal information within a medium.

57. Method of claim 55 comprising typesetting.

58. Method of claim 56 comprising typewriting.

59. Method of claim 55 in which further processing is in a computer.

60. Method of claim 55 in which further processing comprises word processing.

61. Method of claim 32 in which the said dictionary contains pattern variations so that the number of dictionary entries exceeds said pattern vocabulary.

62. Method of claim 61 in which the said first signal information includes strokes, a stroke being defined as a pattern element resulting from continuous contact of pattern forming means and pattern accommodating means, as well as stroke sequence information and in which said pattern variations include stroke sequence variations.

* * * * *